Jan. 15, 1924.
L. W. MOULTON
1,480,946
COMBINED JIG AND WORK SUPPORT
Filed Oct. 20, 1920
2 Sheets-Sheet 1
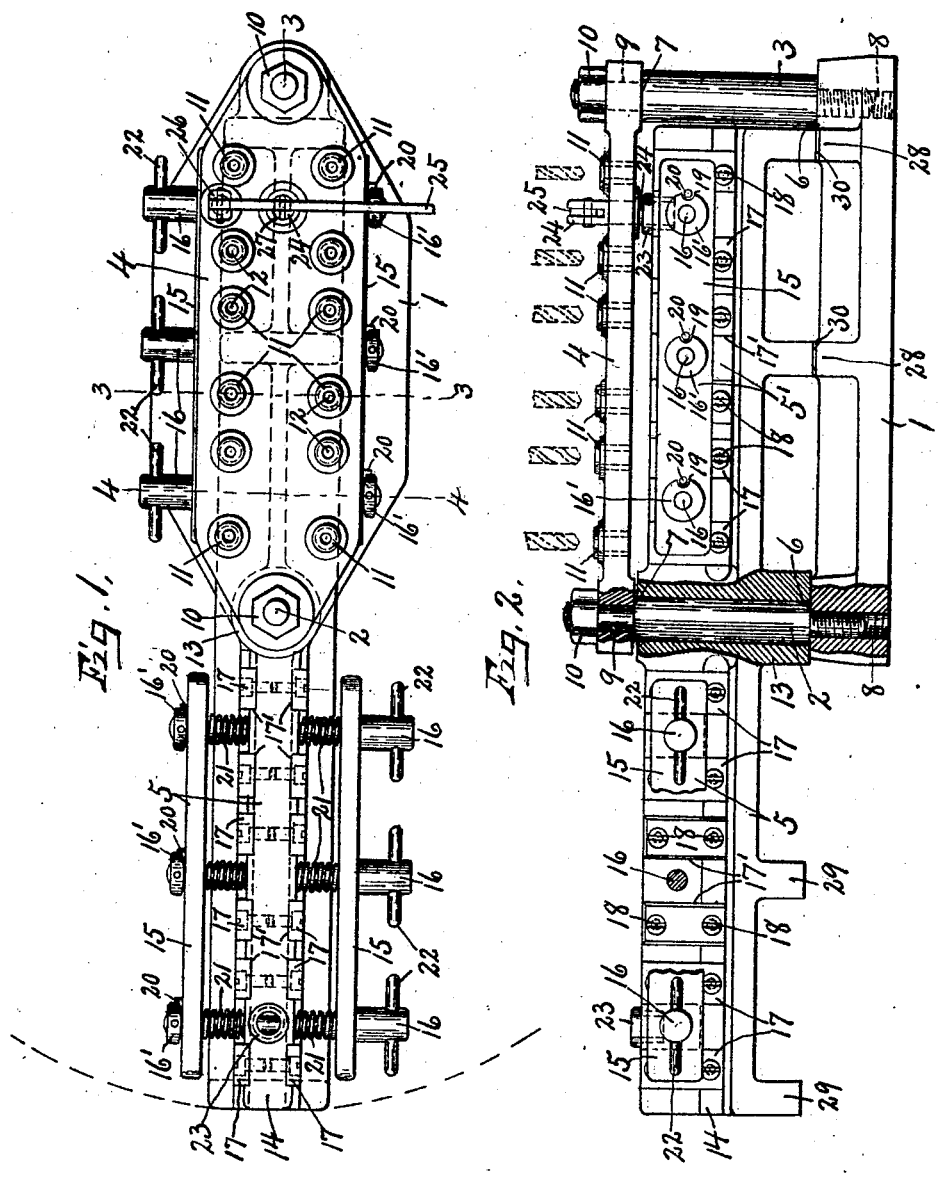

Jan. 15, 1924. 1,480,946
L. W. MOULTON
COMBINED JIG AND WORK SUPPORT
Filed Oct. 20, 1920 2 Sheets-Sheet 2
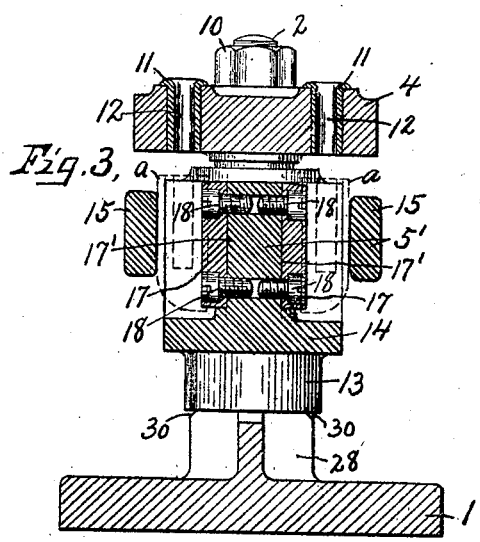
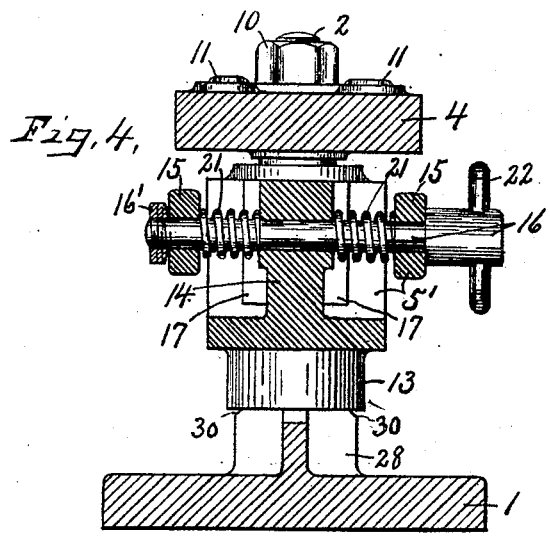

Patented Jan. 15, 1924.

1,480,946

UNITED STATES PATENT OFFICE.

LLOYD W. MOULTON, OF SYRACUSE, NEW YORK, ASSIGNOR OF ONE-HALF TO OSCAR C. KAVLE, OF SYRACUSE, NEW YORK.

COMBINED JIG AND WORK SUPPORT.

Application filed October 20, 1920. Serial No. 418,299.

*To all whom it may concern:*

Be it known that I, LLOYD W. MOULTON, of Syracuse, in the county of Onondaga, in the State of New York, have invented new and useful Improvements in Combined Jigs and Work Supports, of which the following, taken in connection with the accompanying drawings, is a full, clear, and exact description.

This invention relates to a combination jig and work-support for gang drills, reamers, taps and analogous machines by which a multiplicity of holes are to be simultaneously drilled, bored, reamed or tapped, and involves the use of a plurality of work-supports movable alternately or successively into and out of registration with the jig, whereby the drilling of the work on one of the supports may proceed with the placing of the work upon another one of the supports, while the finished work on another one of the supports may be removed and replaced by additional work to be drilled, reamed or tapped without material loss of time, the main object being to facilitate and to expedite the several operations so as to greatly increase the output for a given period of time without increasing the cost of labor.

Another object is to provide means whereby the work may be easily and quickly clamped upon and released from either support with the assurance that when clamped in place, it will be in proper position for registering the parts to be drilled with their respective jig-guides.

Other objects and uses relating to specific parts of the apparatus will be brought out in the following description.

In the drawings:

Figures 1 and 2 are, respectively, a top plan and a side elevation of an apparatus embodying the various features of my invention, a portion of Figure 2 being in section to show the pivotal bolt for the work-supports.

Figures 3 and 4 are enlarged sectional views taken, respectively, on line 3—3 and 4—4, Figure 1.

As illustrated, this device comprises a base —1—, upright end studs —2— and —3—, a cap or jig plate —4— and a pair of work-supports —5'— pivotally mounted upon one of the studs, as —2—, for horizontally swinging movement in a plane between the base —1— and jig plate —4—.

The base —1— may be clamped or secured in any well known manner to the bed or work table of a drill press or analogous machine carrying a series of drills, reams or taps for producing and finishing the necessary holes in the work. The studs or bolts —2— and —3— are similar, each having its opposite ends reduced to form lower and upper shoulders —6— and —7— in equal vertically, spaced relation, the lower reduced ends being threaded and screwed into threaded sockets —8— in the corresponding ends of the base —1—, while the shoulders —6— abut against the upper face of said base.

The upper shoulders —7— form supports or abutments against which the opposite ends of the jig plate —4— rest when adjusted for use, said jig plate being provided with apertures —9— for receiving the reduced upper ends of the studs —2— and —3—, and is held in place by nuts —10— engaging the threaded extremities of said reduced upper ends of the studs —2— and —3—. The base —1—, studs —2— and —3— and jig plate —4— constitute what may be termed a jig frame in which the plate —4— is provided with a plurality of, in this instance —12—, vertical openings arranged in rows lengthwise of the plate at opposite sides of the longitudinal center thereof.

Within these openings are tightly fitted a corresponding number of hardened steel bushings —11— having central openings —12— for receiving and guilding a corresponding number of rotary drills, reamers or taps which may be employed for producing and finishing the holes in the work, it being understood that the bushings —12— are set in a predetermined relation to each other, and that the drill spindles are adjusted to register coaxially with their respective bushings.

The work supporting arms —5— and —5'— are integrally united at one end to a supporting hub —13— and extend radially therefrom in opposite directions, although it is evident that the number of work-supporting arms may be increased if desired without departing from the spirit of the invention.

The hub —13— carrying both of the work-supporting arms is journaled upon the stud —2— and is of substantially the same height as the distance between the adjacent faces of the base plate —1— and jig plate —4— which serve to hold the hub and work-supporting arms thereon against undue vertical movement, and, at the same time, allows said arms to be swung horizontally to and from a position between the plates —1— and —4— or into and out of registration with the jig plate —4—.

Each work-support comprises a radially extending arm —14—, a pair of clamping bars —15— running lengthwise of the corresponding arm at opposite sides thereof, and a plurality of, in this instance three, clamping bolts —16— extending transversely through suitable apertures in the arm —14— and plates —15— for adjusting said clamping plates toward and from the adjacent faces of the arm —14— in clamping and releasing the work as —a— upon and from said support.

The work to be operated upon is shown by dotted lines in Figure 3, and consists of a series of similar pieces of metal corresponding in number to the number of bushings —12—, and all requiring the same or similar operations, in this instance, the drilling of holes therein, and, in order that they may be properly positioned upon their respective supports to register with their respective bushings —12— when brought into registration with the jig plate, the opposite sides of each arm —14— are provided with a plurality of upright parallel recesses —16— in which a corresponding number of hardened guide plates —17— are seated and held in place by screws —18—, said guide plates projecting beyond the corresponding faces of the arm —14— to receive and support the several pieces of work —a— which are held in place by the clamping bars —15— and adjusting screws —16—.

These work-supporting bars —17— are arranged to hold their respective pieces of work in registration with the corresponding guide openings —12— when their support is registered with the jig plate —4— to enable the holes to be drilled and finished in the work as determined by the relative positions of the jig holes —12— through which the drills or other finishing tools are passed during drilling, reaming, or tapping operations.

The screws —16— are enlarged at one end to form heads which abut against the outer face of one of the bars —15—, while their opposite ends are threaded and engaged by nuts —18— abutting against the outer face of the other clamping bar —15—, said nuts having peripheral recesses —19— for receiving key pins —20— on the adjacent bar —15— to hold the nuts against turning while the screws are being adjusted to tighten and release the bars —15— upon and from the work. Suitable springs —21— encircle the screws —16— between both of the bars —15— and adjacent faces of the arm —14— tending to force said bars —15— outwardly to automatically release the work when the screws are loosened.

It will be noted that each of the work supports is provided with a separate set of clamping bars —15— and a separate set of adjusting screws —16— therefor, the adjusting screws being reversely arranged on each support so that their heads which are provided with handles —22— will be presented at the same side or front of the machine when either support is moved out of registration with the jig plate, or into position for removing or receiving the work.

Suitable means is provided for locking each work-support in operative position when registered with the jig plate, and, for this purpose, each of the arms —14— is provided near its outer end with a hardened bushing —23— having a central vertical opening for receiving a locking bolt —24— which is pivotally attached to an operating lever —25—, the latter being pivoted to a stud —26— on the jig plate —4—, as shown in Figures 1 and 2.

The locking bolt —24— is movable in a guide opening —27— in the jig plate —4— midway between the opposite rows of bushings —11— a distance from the axis of the pivotal bolt —2— corresponding to the distance of the bushings —23— from the same, so that when either of the work-supports is moved into operative position beneath the plate —4—, its bushing —23— will be registered with the guide opening —27— for the bolt —24— to permit the latter to be moved into and out of the registering bushing —23— by means of the hand lever —25— for locking and releasing the registering work-support in and from its operative position for drilling, reaming or tapping the work thereon.

In order that each work-support may be held against springing downwardly under the pressure produced by the drills, reamers, or taps upon the work, the base —1— is provided with suitable rests —28— at intervals between the bolts —2— and —3—, while each of the arms —14— of the work-supports is provided with a corresponding number of feet or pendant arms —29— adapted to register with and to rest upon the rests —28— when each work-support is moved into registration with the jig plate —4—, the side corners of the upper face of each of the rests —28— being beveled at —30— to permit the pendent arms or feet —29— to ride freely upon the rests when the supports are shifted into position for operating upon the work, as shown more clearly in Figs. 3 and 4.

It is evident from the foregoing description that the number of work-supports and manner of mounting them to swing into and out of registration with the jig plate, and that the number and relative location of the tool guides in the jig may be varied without departing from the spirit of this invention, and, therefore, I do not wish to limit myself to the construction shown and described.

What I claim is:

1. The combination of a jig-frame having a jig-plate provided with a plurality of tool guides, and a plurality of work-supports hinged to said frame to swing to and from a position beneath the jig-plate, and each provided with means for holding the parts of the work to be operated upon in position to register with the tool guides when moved to a position beneath the jig-plate.

2. The combination of a jig-plate having a plurality of tool-guides, a plurality of work-supports movable into and out of registration with the jig-plate and provided with means for holding the part of the work to be operated upon in position to register with the tool guides when registering with the jig-plate, and means for locking and releasing the work-supports in and from their working positions.

3. The combination of a relatively stationary jig-plate having a plurality of tool-guides, a plurality of work-supports hinged to the jig-plate to swing into and out of registration therewith and each provided with means for holding the parts of the work to be operated upon in position to register with the tool guides when registering with the jig-plate.

4. The combination of a relatively stationary jig-plate having a plurality of tool-guides, a plurality of work-supports hinged to the jig-plate to swing into and out of registration therewith and each provided with means for holding the parts of the work to be operated upon in position to register with the tool guides when registering with the jig-plate, and means for locking and releasing the work-supports in and from their working positions.

5. In a combined drill jig and work-support, the combination of a base, a jig plate having a plurality of tool guides, means including a pivotal bolt for holding the base and jig-plate in fixed spaced relation, a hub journaled on the pivotal bolt and provided with radial work-supporting arms movable to and from a position beneath the jig-plate, and separate devices for clamping and releasing the parts of the work to be operated upon to and from said arms.

In witness whereof I have hereunto set my hand this 12th day of August, 1920.

LLOYD W. MOULTON.

Witnesses:
H. E. CHASE,
MARJORIE L. QUINELL.